Oct. 7, 1969   G. A. VANDER HAAGEN   3,471,709
MAGNETIC CORE FLIP-FLOP CIRCUIT
Filed Sept. 27, 1965

INVENTOR
Gary A. Vander Haagen
BY
Thomas N. Young
ATTORNEY

United States Patent Office 3,471,709
Patented Oct. 7, 1969

3,471,709
MAGNETIC CORE FLIP-FLOP CIRCUIT
Gary A. Vander Haagen, Ann Arbor, Mich., assignor to General Motors Corporation, Detroit, Mich., a corporation of Delaware
Filed Sept. 27, 1965, Ser. No. 490,545
Int. Cl. H03k 3/286
U.S. Cl. 307—88                  2 Claims

ABSTRACT OF THE DISCLOSURE

A bistable or flip-flop circuit including two closed magnetic flux paths, each having a high magnetic remanence. The magnetic flux paths are electrically interconnected so as to normally reside in opposite remanent magnetic flux conditions and so as to relatively change remanent magnetic flux conditions in response to an input signal.

---

This invention relates to logic circuits and more particularly to a logic circuit employing a pair of closed magnetic flux paths of high remanence and magnetically cross-coupled switch means to provide a bistable or flip-flop action.

It is well known that a bistable multivibrator circuit, commonly called a flip-flop, may be constructed using capacitively cross-coupled circuit elements such as transistors or vacuum tubes. These flip-flop circuits are commonly used as logic circuits in computing or data processing apparatus. Such circuits generally require continuous application of power to maintain data storage; that is, to remain in one of the two states of operation. This requirement may be disadvantageous where long time data storage is necessary and only limited amounts of power are available.

The present invention provides a multivibrator logic circuit which does not require continuous application of power for data storage thus conserving power when operated at a low frequency. In addition, the inventive magnetic flip-flop circuit may be constructed using a small number of parts and without the presence of any capacitive cross-coupling circuit. In general this is accomplished through the use of means defining two closed magnetic flux paths of high remanence and a pair of complementary current paths linking the flux paths in an individual fashion and including switch means which may be separately rendered conductive for the purpose of changing the remanent magnetic states of the flux paths. Magnetic cross-coupling is provided by linking each flux path with a conductor means which is operatively connected to the switch means associated with the opposite magnetic flux path. This cross-coupling provides a complementary or balanced multivibrator action in combination with input means operatively connected with both the first and second flux paths for varying the remanent flux conditions thereof at a rate which may be chosen in accordance with the requirements of the particular application of the present invention.

A detailed description of a specific embodiment of the invention is given in the following specification which is to be taken with the accompanying figures of which:

Figure 1:
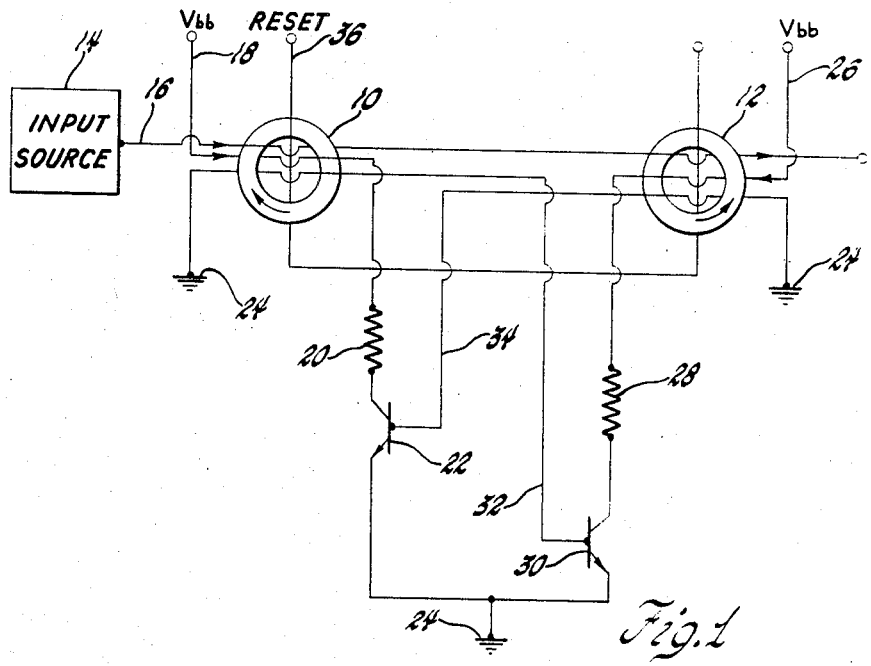
FIGURE 1 is a schematic diagram of a specific embodiment of the invention.

Referring to FIGURE 1, a magnetic multivibrator or flip-flop circuit is shown to include first and second toroidal magnetic cores 10 and 12, respectively. The cores 10 and 12 form closed flux paths and may be constructed of a highly remanent magnetic material such as ferrite which is known to exhibit a substantially "square" hysteresis loop. By "square" it is meant that the material may be permanently magnetized in either of two oppositely directed magnetic orientations corresponding in the drawings with clockwise or counterclockwise remanent flux conditions. For purposes of discussion, it will be assumed that neither of the cores 10 nor 12 ever exists in a neutral or entirely unmagnetized flux condition. Magnetic core 10 normally resides in a clockwise flux condition as indicated in FIGURE 1 by the small arrowhead on the core. On the other hand, core 12 normally resides in a counterclockwise flux condition as also indicated by the small arrowhead in FIGURE 1. An input system comprising an input source 14 and an associated conductor 16 which links cores 10 and 12 in the same magnetic sense is provided for controlling the instantaneous flux conditions of the cores 10 and 12. Accordingly, the input source 14 represents a current source capable of producing current pulses of sufficient magnitude and previously chosen polarity to completely reverse the flux condition of either of the cores 10 and 12.

Considering core 10 as a portion of a first stage of the two-stage flip-flop circuit, it can be seen in FIGURE 1 that this stage further includes a current path comprising the combination of a voltage source indicated as $V_{bb}$, a conductor 18, a series load resistor 20 and the output electrodes, that is, collector and emitter, of an NPN type transistor 22. The emitter of transistor 22 is connected to a point of reference potential indicated as ground 24. The current path comprising conductor 18, resistor 20 and the output electrodes of transistor 22 link magnetic core 10 in a direction opposite to that of input conductor 16. Accordingly, from the familiar righthand rule, it can be seen that a current pulse in the direction indicated by the emitter arrow on transistor 22 will tend to produce a counterclockwise flux in core 10.

Considering the second multivibrator stage which includes core 12, it can be seen that this stage further includes the voltage source $V_{bb}$, a conductor 26, a series load resistor 28 and the output electrodes of a second NPN type transistor 30. The emitter of transistor 30 is also connected to ground 24. The current path which is formed by the combination of conductor 26, resistor 28 and the output electrodes of transistor 30 links magnetic core 12 in a sense opposite to that of input line 16 and hence current flow in the direction indicated by the emitter arrow of transistor 30 will also tend to produce a counterclockwise flux in magetic core 12.

Cross-coupling of the two stages previously described with respect to FIGURE 1 is provided by means of a pair of conductors 32 and 34. Conductor 32 is connected on one side to ground 24, is threaded through core 10 and is connected on the other side to the input or base electrode of transistor 30. Similarly, conductor 34 is connected on one side to ground, links magnetic core 12 and is connected to the input or base electrode of transistor 22. It will be appreciated by those skilled in the art that flux reversals in the cores 10 and 12 which produce relatively positive voltage pulses in the conductors 32 and 34 will tend to render the associated transistors 30 and 22, respectively, conductive thus producing current surges in the associated current paths 26 and 18, respectively.

The combination shown in FIGURE 1 further includes a reset line 36 which links both cores 10 and 12 in a common sense and may be supplied with current pulses of appropriate magnitude and polarity to initialize or reset the magnetic cores at any point in the operation thereof.

OPERATION

Figure 2:
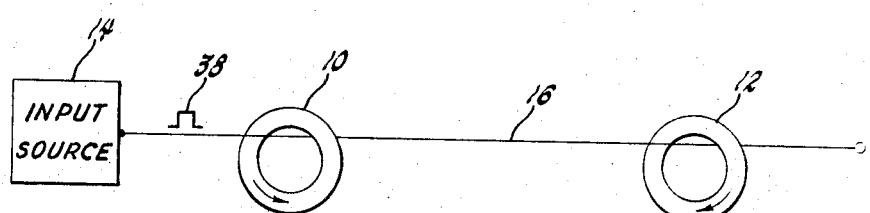
FIGURE 2 is a schematic representation of a portion of the circuit of FIGURE 1 indicating the magnetic flux conditons after the application of a first input signal.

In operation, the magnetic flip-flop circuit may be initialized by means of a current pulse through reset line 36 to place the cores 10 and 12 in the magnetic condition shown in FIGURE 1; that is, the core 10 is magnetized in a clockwise condition while core 12 is magnetized in a counterclockwise position. Upon the occurrence of a first positive current pulse 38 from the input source 14, a flux inducing field will be produced around conductor 16 tending to orient the flux in cores 10 and 12 according to the familiar righthand rule. It can be seen that a positive current pulse through line 16 produces a flux which is in the same direction as the pre-existing flux condition in core 10 but is opposite in direction to the pre-existing flux condition in core 12. As previously described, the pulse 38 is of sufficient magnitude to fully reverse the flux condition of core 12 as indicated in FIGURE 2. The relatively large change in flux which is experienced by core 12 during the rise time of pulse 38 tends to induce by transformer action a voltage in cross-coupling conducter 34 which, because of the sense in which conductor 34 links core 12, applies a signal to the input electrode of transistor 22 tending to turn that transistor on. Transistor 22 as well as transistor 30 is operated in essentially a switching mode; that is, the transistors are either fully on or fully off. Therefore, the number of windings of conductor 34 around core 12 is selected to produce a pulse which fully saturates transistor 22. When transistor 22 becomes conductive a current surge from the voltage source $V_{bb}$ flows through conductor 18 and load resistor 20 to ground 24. This current flowing in the path defined by conductor 18, being opposite in magnetic effect to the current pulse 38 in line 16, reverses the remanent flux condition in core 10 as also indicated in FIGURE 2. The current experienced by switching transistor 22 on overrides the input pulse 38 in reversing the flux in core 10. It should be noted that the flux reversal from clockwise to counterclockwise produces a voltage in coupling conductor 32, but is of the opposite polarity to that which would turn transistor 30 on.

Thus at then end of the first pulse 38 both cores 10 and 12 have reversed in flux condition and a current surge through load resistor 20 in the first or lefthand multivibrator stage has occurred. The overriding of the effect of the input pulse by the current surge through conductor 18 is enhanced due to the duration of the pulse supplied by transistor 22 which is slightly longer than the duration of pulse 38 due to the RL time constant of the conductors.

Figure 3:
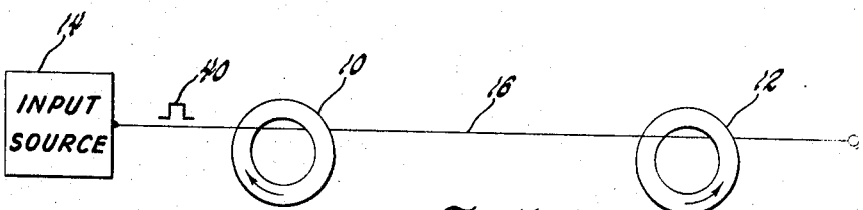
FIGURE 3 is a representative portion of the circuit of FIGURE 1 indicating the magnetic flux conditions after application of a second input signal.

Referring to FIGURE 3, a second pulse 40 from source 14 produces an effect which is the reverse of that described above. More specifically, the flux induced by the second pulse 40 on line 16 is in the same clockwise direction as the pre-existing flux in core 12 shown in FIGURE 2 but is opposite to the counterclockwise direction of the flux in core 10 as also shown in FIGURE 2. Accordingly core 10 is immediately switched thus inducing a voltage in cross-coupling conductor 32. This voltage is applied to the input electrode of transistor 30 which because of the switching action becomes conductive sending a surge of current through conductor 26 and load resistor 28. This surge of current reverses the flux direction of core 12 as indicated in FIGURE 3 leaving both cores 10 and 12 in the initial condition which is also exhibited by the arrows in FIGURE 1. Again, the flux reversal in core 12 produces a voltage in line 34, but opposite in polarity to that which would render transistor 22 conductive. Thus it can be seen that both cores switch in remanent flux condition upon the occurrence of each input pulse from source 14 and complementary current pulses are produced in the load resistors 20 and 22 in the two stages of the magnetic flip-flop circuit.

As will be apparent to those skilled in the art, various means may be employed to define the flux paths defined in the specific embodiment by cores 10 and 12 as well as the conductors which link these flux paths. In addition, switch means other than transistors mty be employed, the only requirement being the presence of a primary current path the conductivity of which may be regulated by the application of signals to a control input.

Various other modifications and additions to the invention will be apparent to those skilled in the art, and accordingly the foregoing description is not to be construed in a limiting sense. For a definition of the invention reference should be had to the appended claims.

I claim:

1. A bistable flip-flop circuit, comprising: first and second magnetic cores each having a high magnetic remanence so as to be capable of residing in either of opposite first and second magnetic conditions, one of the magnetic cores normally residing in the first magnetic condition and the other of the magnetic cores normally residing in the second magnetic condition; first and second transistors each having a control electrode and an output electrode; a first output conductor coupled to the output electrode of the first transistor and connectible to a source of voltage, the first output conductor linking the first magnetic core in such a manner that when the first transistor is conductive a current flows through the first output conductor to switch the first magnetic core to the first magnetic condition; a second output conductor coupled to the output electrode of the second transistor and connectible to a source of voltage, the second output conductor linking the second magnetic core in such a manner that when the second transistor is conductive a current flows through the second output conductor to switch the second magnetic core to the first magnetic condition; a first control conductor coupled to the control electrode of the first transistor, the first control conductor linking the second magnetic core in such a manner that when the second magnetic core is switched to the second magnetic condition a voltage pulse is induced within the first control conductor to render the first transistor conductive for a brief period determined by the duration of the voltage pulse; a second control conductor coupled to the control electrode of the second transistor, the second control conductor linking the first magnetic core in such a manner that when the first magnetic core is switched to the second magnetic condition a voltage pulse is induced within the second control conductor to render the second transistor conductive for a brief period determined by the duration of the voltage pulse; and an input conductor connectible to a source of current pulses, the input conductor linking the first and second magnetic cores in such a manner that when a current pulse flows through the input conductor the one of the magnetic cores in the first magnetic condition is switched to the second magnetic condition.

2. A bistable flip-flop circuit, comprising: first and second magnetic cores each exhibiting a substantially square hysteresis characteristic so as to be capable of residing in either of opposite first and second magnetic conditions; a reset conductor connectible to a source of reset current pulses, the reset conductor linking the first and second magnetic cores in an opposite sense so that when a reset current pulse flows through the reset conductor one of the magnetic cores is switched to the first magnetic condition and the other of the magnetic cores is switched to the second magnetic condition; first and second output conductors linking the first and second magnetic cores respectively in the same sense; first and second control conductors linking the first and second magnetic cores respectively in the same sense; a first transistor having a control electrode electrode and an output electrode, the output electrode coupled to the first output conductor so that when the first transistor is conductive a current flows through the first output conductor to switch the first magnetic core to the first magnetic condition, the control electrode coupled to the first control conductor so that when the second magnetic core is switched to the second magnetic condition a voltage pulse is induced within the first control conductor to render the first transistor conductive for a brief period which is a predetermined portion of the duration of the voltage pulse; a second transistor having a control electrode and an output electrode, the output electrode coupled to the second output conductor so that when the second transistor is conductive a current flows through the second output conductor to switch the second magnetic core to the first magnetic condition, the control electrode coupled to the second control conductor so that when the first magnetic core is switched to the second magnetic condition a voltage pulse is induced within the second control conductor to render the second transistor conductive for a brief period which is a predetermined portion of the voltage pulse; and an input conductor connectible to a source of input current pulses, the input conductor linking the first and second magnetic cores in the same sense so that when an input current pulse flows through the input conductor the one of the magnetic cores in the first magnetic condition is switched to the second magnetic condition.

References Cited
UNITED STATES PATENTS 2,994,788   8/1961   Clark _____ 307—282

TERRELL W. FEARS, Primary Examiner

G. M. HOFFMAN, Assistant Examiner

U.S. Cl. X.R.
307—282